(12) United States Patent
Qi et al.

(10) Patent No.: US 8,879,975 B2
(45) Date of Patent: Nov. 4, 2014

(54) FUSER MEMBER

(71) Applicant: Xerox Corporation, Norwalk, CT (US)

(72) Inventors: Yu Qi, Oakville (CA); Nan-Xing Hu, Oakville (CA); Qi Zhang, Milton (CA); Brynn M. Dooley, Toronto (CA)

(73) Assignee: Xerox Corporation, Norwalk, CT (US)

( * ) Notice: Subject to any disclaimer, the term of this patent is extended or adjusted under 35 U.S.C. 154(b) by 69 days.

(21) Appl. No.: 13/689,174

(22) Filed: Nov. 29, 2012

(65) Prior Publication Data

US 2014/0147180 A1   May 29, 2014

(51) Int. Cl.
  *G03G 15/20* (2006.01)
  *B82Y 30/00* (2011.01)

(52) U.S. Cl.
  CPC ............ *G03G 15/2057* (2013.01); *B82Y 30/00* (2013.01)
  USPC ............... 399/333; 399/121; 430/56; 430/86

(58) Field of Classification Search
  USPC .......................... 399/121, 333; 430/56, 84, 86
  See application file for complete search history.

(56) References Cited

U.S. PATENT DOCUMENTS 7,991,340 B2   8/2011  Qi et al.
8,431,217 B2 *  4/2013  Gervasi et al. ................ 428/323

OTHER PUBLICATIONS

Lee et al., "Selective-Area Fluorination of Graphene with Fluoropolymer and Laser Irradiation", dx.doi.org/10.1021/nl300346j, Nano Letters 2012, 12, 2374-2378.

* cited by examiner

*Primary Examiner* — Walter L Lindsay, Jr.
*Assistant Examiner* — Roy Y Yi
(74) *Attorney, Agent, or Firm* — Hoffman Warnick LLC

(57) ABSTRACT

There is disclosed a fuser member that includes a substrate layer and a surface layer disposed on the substrate layer. The surface layer includes a fluoropolymer having dispersed therein fluorinated graphene particles. A method of manufacturing a fuser member is also provided.

20 Claims, 5 Drawing Sheets

FUSER MEMBER

BACKGROUND

1. Field of Use

This disclosure is generally directed to surface layers for fuser members useful in electrophotographic imaging apparatuses, including digital, image on image, and the like.

2. Background

Fluoroplastics such as polytetrafluoroethylene (PTFE, tradeneame Teflon®) or perfluoroalkyl resin (PFA) are currently used as fuser topcoat materials for oil-less fusing. Carbon nanotubes (CNT) dispersed in a fluoroplastic polymer have provided fuser members with improved mechanical, electrical and thermal properties. A fuser topcoat containing CNT having a fluoroelastomer shell layer dispered in a fluoroplastic is described in U.S. Pat. No. 7,991,340, and incorporated herein by reference in its entirety. However, there is a safety concern about handling the dry CNT powder during the coating formulation preparation.

A coating having a low surface energy that is durable and easily manufactured is desirable.

SUMMARY

According to an embodiment, there is provided a fuser member comprising a substrate layer and a surface layer disposed on the substrate layer. The surface layer comprises a fluoropolymer having dispersed therein fluorinated graphene particles.

According to another embodiment, there is provided a method of making a fuser member. The method includes obtaining a fuser member comprising an intermediate layer disposed on a substrate. A composition of fluoropolymer particles, fluorinated graphene particles, fluorinated surfactant and solvent is coated on the intermediate layer to form a coated layer. The coated layer is heated to a temperature of from about 300° C. to about 380° C. wherein solvent is removed and the fluoropolymer particles melt or cure to form a release layer.

According to another embodiment, there is provided a fuser member comprising a substrate, an intermediate layer disposed on the substrate and a surface layer disposed on the resilient layer. The surface layer comprises a fluoropolymer having dispersed therein fluorinated graphene particles.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
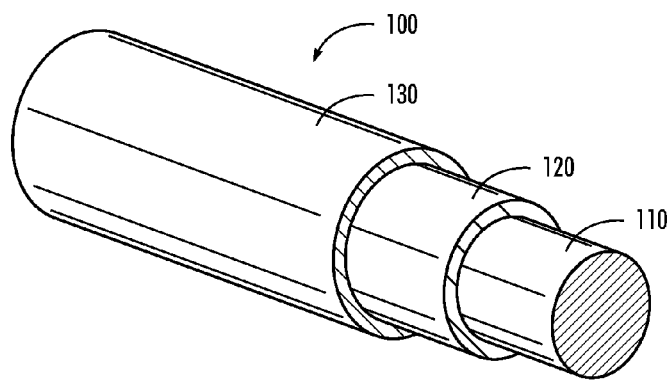
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
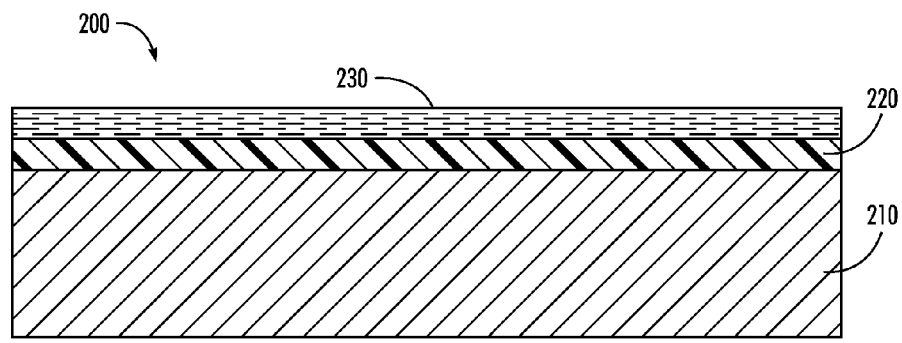
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon.

Substrate Layer

The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum or stainless steel) to maintain rigidity and structural integrity as known to one of ordinary skill in the art.

Intermediate Layer

Examples of intermediate or functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of intermediate or functional layers 120 and 220 also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF®, NM® FOR-THF®, FOR-TFS® TH® NH®, P757® TNS®, T439 PL958® BR9151® and TN505, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the intermediate or functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

Release Layer

Disclosed herein is a release layer or surface layer containing a fluorinated graphene/fluoropolymer composite. The graphene is partially fluorinated, which improves the dispersion properties of the graphene in a fluoropolymer/fluorinated graphene composition. Although the fluorinated regions have a much higher electrical resistance than pristine graphene, the basic skeletal carbon network of the material remains intact. Therefore, a fuser topcoat with the fluorinated graphene and fluoropolymer is mechanically robust, and electrically and thermally conductive to meet fuser specifications. The composite fuser topcoat can be prepared by flow-coating a dispersion of fluoropolymer, fluorinated graphene and solvent and optionally a fluorinated surfactant such as GF400, followed by heating above PFA melting temperature to cure the composition and form a surface layer.

Additives and additional conductive or non-conductive fillers may be present in the substrate layers 110 and 210, the intermediate layers 220 and 230 and the release layers 130 and 230. In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Adhesive Layer

Optionally, any known and available suitable adhesive layer may be positioned between the outer layer or outer surface, the intermediate layer and the substrate. The adhesive layer can be coated on the substrate, or on the outer layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Figure 3A:
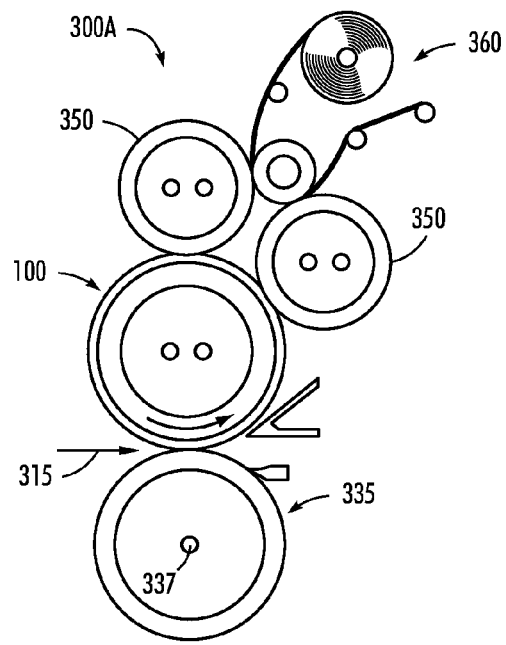
FIGS. 3A-3B depict exemplary fusing configurations using the fuser rollers shown in FIG. 1 in accordance with the present teachings.
Figure 3B:
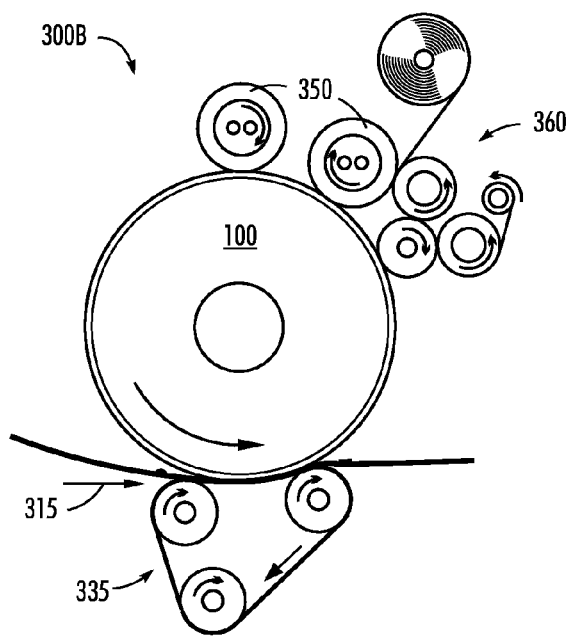
Figure 4A:
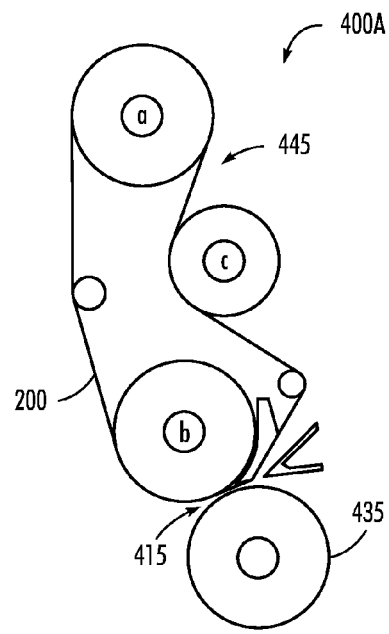
FIGS. 4A-4B depict another exemplary fusing configurations using the fuser belt shown in FIG. 2 in accordance with the present teachings.
Figure 4B:
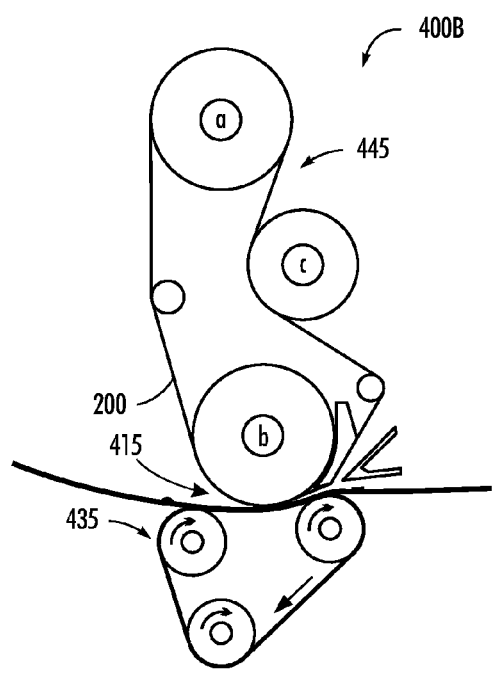

FIGS. 3A-3B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
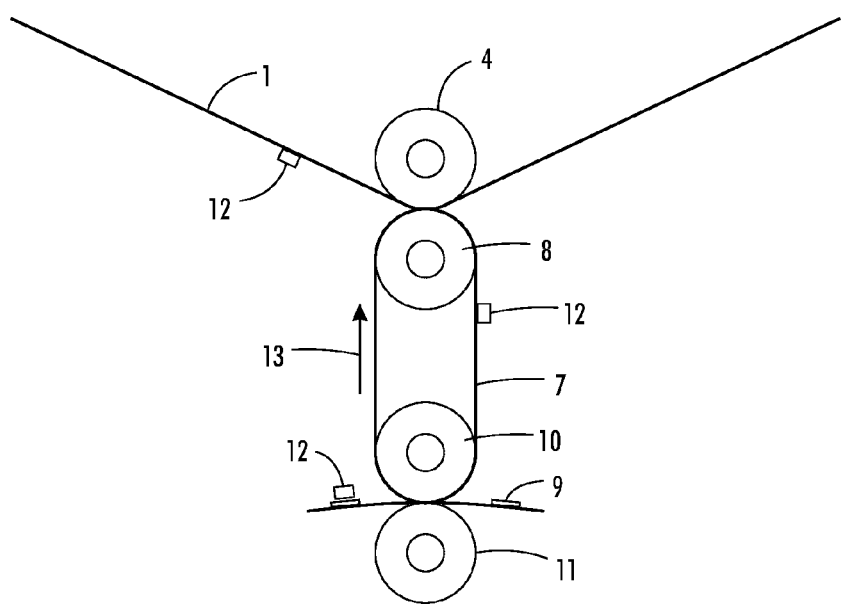
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Described herein is a fluorinated graphene/fluoropolymer surface coating for a fuser member. The graphene is partially fluorinated, where fluorine is directly bonded onto the graphene carbon. The partially fluorinated graphene improves the dispersion quality in the coating composition and results in a surface layer having improved properties including improved toner release performance.

Dispersion quality of graphene particles and fluoropolymer particles in a solvent is critical for achieving the true benefit of graphene for fuser topcoats. Poor dispersion or agglomeration can produce surface layers with insufficient toner release characteristics due to contamination and lack of thermal conductivity. Graphene particles tend to stick together and are difficult to exfoliate. It is also desirable to surface-modify graphene to be more hydrophobic to provide improved toner release performance. The fluorine increases the surface energy of the graphene so particles that are at the surface of the release layer do not negatively impact toner release. The fluorinated graphene is present in an amount of from about 0.1 weight percent to about 15 weight percent, or from about 0.5 weight percent to about 10 weight percent, from about 1 weight percent to about 5 weight percent of the coating of the surface layer.

The fluorinated graphene particles are planar particles. The thickness of the fluorinated graphene particles is from about 0.34 nm to about 100 nm, or from about 0.5 nm to about 75 nm or from about 0.7 nm to about 50 nm. The planar or long dimension can range from 0.3 µm to about 10 µm, or from about 0.4 µm to about 7 µm or from about 0.5 µm to about 5 gm.

Figure 6:
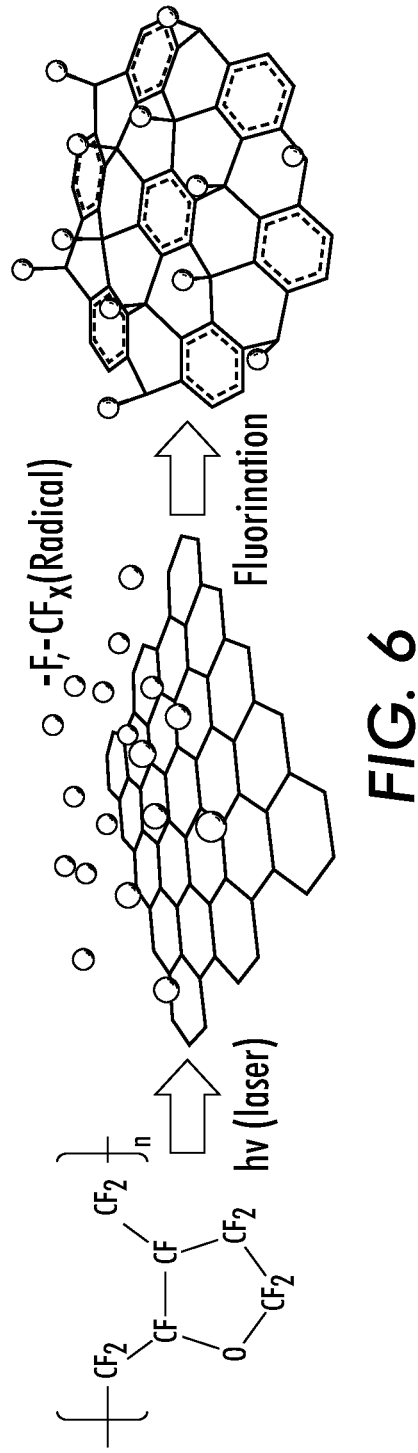
FIG. 6 the chemical process used to make fluorinated graphene.

Fluorinated graphene can be produced using a fluoropolymer (i.e., Cytop® available from Bellex International Corporation) and a laser beam for fluorinating selected regions of graphene (FIG. 6). As the fluorination only happens in the areas struck by laser, the basic skeletal carbon network of the material remains intact. Using the described procedure fluorinated graphene has fluorine on one side of the particle. The weight percent of the fluorine in the fluorinated graphene particle is from about 60 weight percent to about 10 weight percent or from about 50 weight percent to about 15 weight percent or from about 40 weight percent to about 20 weight percent. Graphene particles are available from XGSciences or Strem Chemicals Inc.

Fluoropolymers suitable for use in the formulation described herein include fluoroplastics comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); and copolymer of tetrafluoroethylene (TFE) and hexafluoropropylene (HFP), and mixtures thereof. The fluoroplastic provides chemical and thermal stability and has a low surface energy. The fluoroplastic has a melting temperature of from about 280° C. to about 400° C. or from about 290° C. to about 390° C. or from about 300° C. to about 380° C.

Fluoropolymers suitable for use in the formulation described herein include fluoroelastomers suitable for use in the formulation described are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS$^{tm}$ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF® NM® FOR-THF®, FOR-TFS® TH® NH®, P757 TNS®, T439 PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. The fluoroelastomers are cured at a temperature of from about 80° C. to about 250° C.

To improve the wettability between fluorinated graphene and fluoropolymer particles, a fluorinated surfactant GF300 or 400 (commercially available from Toagosei) is added as a wetting agent. GF-300 and GF-400 are methacrylate-based fluorosurfactant referred to as fluorinated graft copolymers. Others fluorinated surfactants include GF-150 from Toagosei Chemical Industries; MODIPER F-600 from Nippon Oil & Fats Company; SURFLON S-381 and S-382 from Asahi Glass Company; FC-430, FC-4430, FC-4432 and FC-129 from 3M. The amount in the powder is from about 0.1 weight percent to about 5 weight percent, or from about 0.5 weight percent to about 3.0 weight percent, or from about 1.0 weight percent to about 2.0 weight percent based on the total weight of the fluorinated graphene and the fluoropolymer.

The coating composition for the release layer is prepared by shear-mixing the fluorinated graphene and fluoropolymer, for example, THVP210 from Dyneon in a suitable solvent. Solvents suitable for dispersing the fluorinated graphene and fluoropolymer include water; alcohols such as methanol, ethanol, or isopropanol; a ketone such as acetone, methyl ethyl ketone (MEK),methyl isobutylketone (MIBK), or other suitable solvent.

In various embodiments, the coating composition of fluorinated graphene and fluoropolymer solvent and an optional surfactant can be coated using, for example, coating techniques, extrusion techniques and/or molding techniques. As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed.

After coating the composition is heated to a temperature for a time sufficient to melt or cure the fluoropolymer to form the coated layer. Fluoroplastics have a melting temperature of from about 280° C. to about 400° C. or from about 290° C. to about 390° C. or from about 300° C. to about 380° C. and are heated for a time of from about 1 minutes to about 30 minutes, or a time of from about 2 minutes to about 25 minutes, or a time of from about 3 minutes to about 20 minutes. Fluoroelastomers are cured at a temperature of from about 80° C. to about 250° C. for a time of from about 1 minutes to about 30 minutes, or a time of from about 2 minutes to about 25 minutes, or a time of from about 3 minutes to about 20 minutes.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A composite fuser topcoat is prepared by flow-coating a solvent-based dispersion of PFA, fluorinated graphene with fluorinated surfactant, followed by heating above PFA melting temperature and is described in more detail below.

Preparation of coating dispersion

A solvent dispersion containing 0.5 weight percent of fluorinated-graphene was prepared by dispersing 0.6 grams of fluorinated graphene in 120 grams of cyclohexanone (CHN) by sonication for 2 hours with 60 percent output of the sonicator. The dispersion was concentrated to 3 weight percent.

PFA powder (MP320) purchased from DuPont (9 grams) was dispersed by sonication (30 minutes with 60% output) in a mixed solvent of methyl ethyl ketone (MEK) (8 grams) and CHN (3 grams) containing 0.36 grams of GF400 solution. The fluorinated-graphene dispersion (6.2 grams) described above was added to the PFA/MEK dispersion with sonication for 30 minutes. 3.8 grams of poly(propylene carbonate) (PPC, Empower QPAC®40) binder in CHN solution (20 weight percent) was added to the composite dispersion in a roll mill to form a uniform 2 weight percent fluorinated-graphene/PFA composite dispersion.

Fuser Topcoat Preparation

The above 2 weight percent fluorinated-graphene/PFA composite dispersion was applied on the primed (clear primer CL990) silicone roll by flow coating at the flow rate of 3 ml/min with the coating speed of 2 mm/s. The flow-coated composite roll was baked in the oven for one hour to remove the solvents and followed by baking for 15 minutes at 340° C. to form the continuous composite fuser topcoat.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate layer; and
   a surface layer disposed on the substrate layer, the surface layer comprising a fluoropolymer having dispersed therein fluorinated graphene particles and a methacrylate based fluorosurfactant.

2. The fuser member of claim 1, wherein the fluorinated graphene particles have a fluorine content of from about 60 weight percent to about 10 weight percent.

3. The fuser member of claim 1, wherein the fluorinated graphene particles comprise from about 1 weight percent to about 10 weight percent of the surface layer.

4. The fuser member of claim 1, wherein the fluoropolymer comprises a fluoroplastic selected from the group consisting of: polytetrafluoroethylene (PTFE), perfluoroalkoxy polymer resin (PFA), and copolymers of tetrafluoroethylene (TFE) and hexafluoropropylene (HFP).

5. The fuser member of claim 1 further comprising conductive particles selected from the group consisting of: carbon black, tin oxide, antimony dioxide, antimony-doped tin oxide, titanium dioxide, indium oxide, zinc oxide, indium oxide and indium-doped tin trioxide, polyaniline and polythiophene, the conductive particles dispersed in the fluoropolymer of surface layer.

6. The fuser member of claim 1 wherein the surface layer has a thickness of from about 1 micron to about 400 microns.

7. The fuser member of claim 1 wherein the fluorinated graphene particles have a planar dimension of from about 0.3 µm to about 10 µm.

8. A method of making a fuser member comprising:
obtaining a fuser member comprising an intermediate layer disposed on a substrate;
coating a composition of fluoropolymer particles, fluorinated graphene particles, a methacrylate based fluorosurfactant and a solvent on the intermediate layer to form a coated layer; and
heating the coated layer to a temperature of from about 80° C. to about 380° C. wherein solvent is removed and the fluoropolymer particles melt or cure to form a release layer.

9. The method of claim 8, wherein the fluoropolymer particles comprise particles selected from the group consisting of: polytetrafluoroethylene (PTFE); perfluoroalkoxy polymer resin (PFA); copolymers of tetrafluoroethylene (TFE) and hexafluoropropylene (HFP); copolymers of two of vinylidenefluoride, hexafluoropropylene, and tetrafluoroethylene; terpolymers of vinylidenefluoride, hexafluoropropylene; and tetrapolymers of vinylidenefluoride, hexafluoropropylene, tetrafluoroethylene, and a cure site monomer.

10. The method of claim 8, wherein the solvent is selected from the group consisting of: water; methanol, ethanol, isopropanol; actone, methyl ethyl ketone (MEK), methyl and isobutylketone (MIBK).

11. The method of claim 8, wherein the fluorinated graphene particles have a fluorine content of from about 50 weight percent to about 10 weight percent.

12. A fuser member comprising:
a substrate;
an intermediate layer disposed on the substrate; and
a surface layer disposed on the intermediate layer, wherein the surface layer comprises a fluoropolymer having dispersed therein fluorinated graphene particles and a methacrylate based fluorosurfactant.

13. The fuser member of claim 12 wherein the fluorinated graphene particles have a fluorine content of from about 50 weight percent to about 10 weight percent.

14. The fuser member of claim 12, wherein the fluorinated graphene particles comprise from about 1 weight percent to about 10 weight percent of the surface layer.

15. The fuser member of claim 12 wherein the fluoroplastic is selected from the group consisting of polytetrafluoroethylene (PTFE), perfluoroalkoxy polymer resin (PFA), and copolymers of tetrafluoroethylene (TFE) and hexafluoropropylene (HFP).

16. The fuser member of claim 12 wherein the intermediate layer comprises a material selected from the group consisting of silicones, siloxanes, fluorosilicones, vinyl crosslinked heat curable rubbers or silanol room temperature crosslinked materials and fluoroelastomers.

17. The fuser member of claim 12 wherein the fluorinated graphene particles have a planar dimension of from about 0.3 µm to about 10 µm.

18. The fuser member of claim 12 further comprising an adhesive layer disposed between the surface layer and the intermediate layer.

19. The fuser member of claim 12 further comprising an adhesive layer disposed between the intermediate layer and the substrate layer.

20. The fuser member of claim 1, wherein an amount of the methacrylate based fluorosurfactant is from about 0.1 weight percent to about 5 weight percent based on a total weight of the fluorinated graphene and the fluoropolymer.

* * * * *